Jan. 9, 1968   W. H. FANE, JR   3,362,398
OVEN DOOR LATCHING ARRANGEMENT
Filed Sept. 28, 1965   2 Sheets-Sheet 1

INVENTOR.
WILLIAM H. FANE JR.
BY Richard L. Caslin
HIS ATTORNEY

Jan. 9, 1968  W. H. FANE, JR  3,362,398
OVEN DOOR LATCHING ARRANGEMENT
Filed Sept. 28, 1965  2 Sheets-Sheet 2

INVENTOR.
WILLIAM H. FANE JR.
BY Richard L. Caslin
HIS ATTORNEY

United States Patent Office 3,362,398
Patented Jan. 9, 1968

3,362,398
OVEN DOOR LATCHING ARRANGEMENT
William H. Fane, Jr., Anchorage, Ky., assignor to General Electric Company, a corporation of New York
Filed Sept. 28, 1965, Ser. No. 490,837
3 Claims. (Cl. 126—273)

The present invention relates to an automatic locking means for a door latching mechanism and particularly for a door of a high temperature domestic cooking oven of the type having an automatic heat cleaning cycle such as is described and claimed in the patent of Bohdan Hurko 3,121,158 which is assigned to the General Electric Company, the assignee of the present invention.

Such a high temperature oven would have the normal cooking functions of baking and broiling within a temperature range between about 150° F. and 550° F. as well as a heat cleaning operation where the temperature is raised to a maximum somewhere between 750° F. and 950° F. for removing the food soil and grease spatter that accumulates on the walls of the oven liner during normal cooking. Such a self-cleaning reaction may be characterized by the term pyrolysis which means the chemical decomposition of matter by the application of heat.

Undoubtedly, the major annoyance in using an oven for cooking is the difficulty encountered in keeping the walls of the oven liner clean after repeated usage. It is unavoidable that food particles and grease spatterings will accumulate on the hot oven surfaces during the normal cooking operations. Strong chemical cleaning agents have been devised and are commercially available for the express purpose of removing food soil of this type under these conditions. However, even the best of these cleaning agents require a strong rubbing action, and a great deal of time and effort is needed to complete the task satisfactorily. Also, there is always a safety hazard that the chemicals might cause injury to the users hands or eyes if the directions for use are not followed verbatim.

Once the principle and practice of automatic heat cleaning of a domestic oven was perfected by the method of pyrolysis, many different systems of applying the heat and controlling the cleaning operation were devised to obtain the optimum results. To gain the maximum reliability, standard components were used where possible to take advantage of the prior years of engineering development and know-how gained by working with the components, and they were arranged in fail-safe combinations so that after years of trouble-free usage of the oven any failure of a component would not constitute a safety hazard. Instead, the failure of a component would render inoperative the heating circuit or function in which the component is designed to operate.

The present invention is concerned with a thermally responsive locking means for engaging the door latching mechanism of a high temperature oven at a temperature range of about 560° F. and above so as to render the door latching mechanism inoperative until the oven temperature drops below this critical range. The purpose of this is to insure that the oven door cannot be unlatched as long as the oven temperature is above the maximum normal cooking temperature.

The principal object of the present invention is to provide a thermally responsive locking means for the latching mechanism of a door of a high temperature oven where said locking means becomes automatically operative when the oven temperature rises above normal cooking temperatures and remains operative until the oven temperature returns to within the maximum cooking temperature range of about 550° F. and below.

A further object of the present invention is to provide such a thermally responsive locking means with a snap-acting thermal operator so as to minimize the possibility of faulty operation.

A further object of the present invention is to provide a thermally responsive locking means of the class described with a thermal sensing device that is both located within the oven cavity and supported from an oven wall so that it senses both the oven air temperature and the oven wall temperature and provides more accurate control.

A further object of the present invention is to provide for a door latching mechanism, a thermally responsive locking means with a snap-acting temperature sensor, and means to protect the sensor from mechanical injury due to undesirable tampering with the door latching mechanism.

A further object of the present invention is to provide a thermally responsive locking means of the class described using a loose-fitting, non-lubricated linkage mechanism for avoiding sticking problems under high temperature operations.

A still further object of the present invention is to provide a thermally responsive locking means of the class described with a thermal sensor and a substantially counter-balanced bolt member for enabling the thermal sensor to be capable of resisting large forces that may be imposed by the door latching mechanism.

The present invention, in accordance with one form thereof, is adapted for use in a high temperature domestic oven which may be heated either by electricity or gas. As in standard ovens, the oven cavity is formed by an insulated box-like oven liner and an access door. A door latching mechanism is provided to hold the door in a closed position during the high temperature, heat cleaning cycle. A suitable automatic thermally responsive locking means is combined with the door latching mechanism so as to lock this mechanism in its closed position when the oven temperature is above about 560° F. so as to render the door latching mechanism inoperative until the oven temperature returns to within the normal cooking temperature range. The said locking means includes a snap-acting thermal sensor positioned within the cooking cavity and mounted from the walls thereof so as to sense both the oven air and oven wall temperatures. The locking means being incapable of transmitting forces initiated by the door latching mechanism back to the thermal sensor so as to protect the sensor from excessive mechanical strains and possible failure.

My invention will be better understood from the following description taken in conjunction with the accompanying drawings and its scope will be pointed out in the appended claims.

Figure 1:
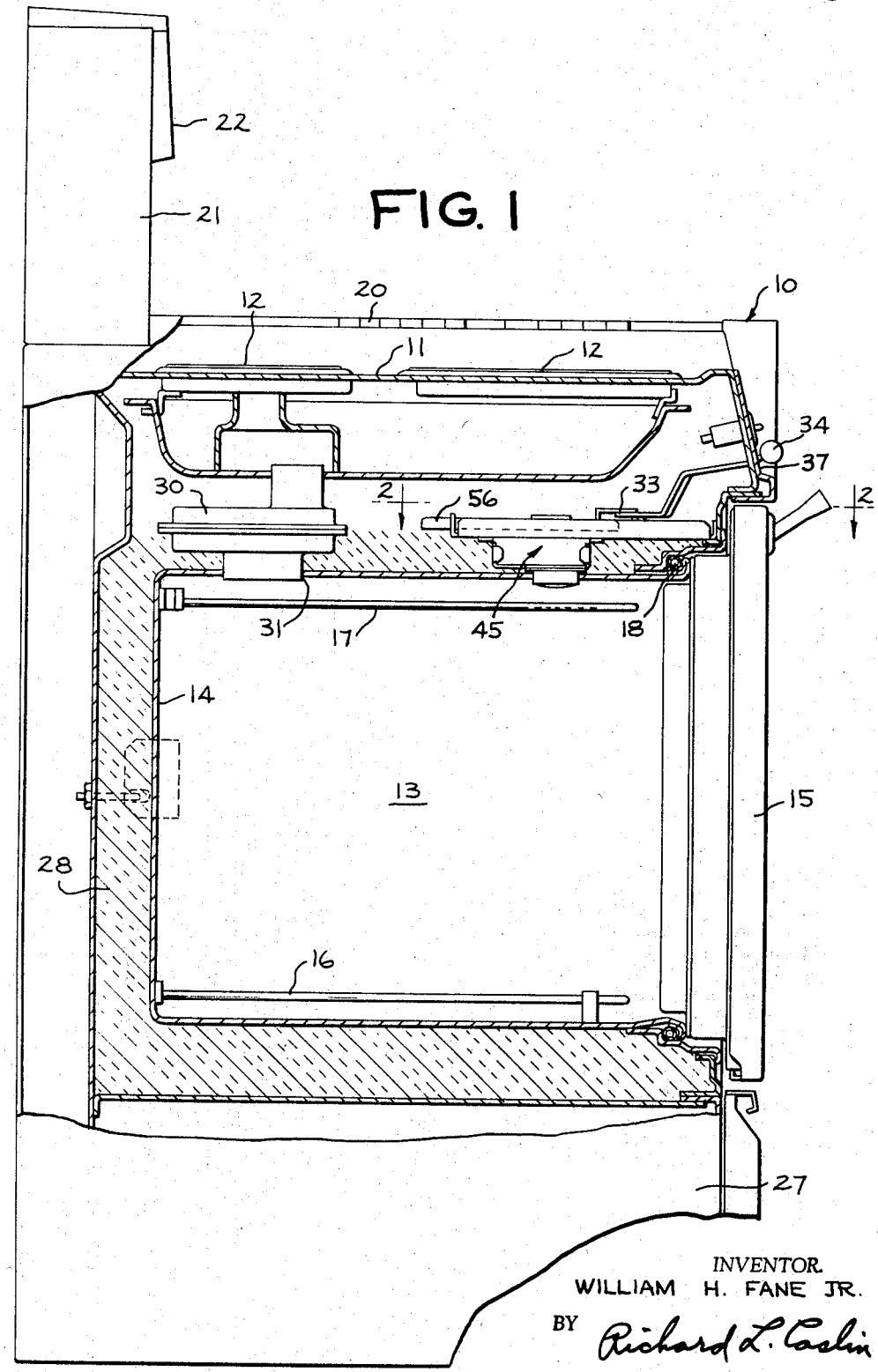
FIGURE 1 is a left side elevational view of a free-standing electric range with parts broken away and some in cross-section to show the main elements of an oven having a thermally responsive locking means embodying the present invention for a door latching mechanism of a high temperature oven.

Turning now to a consideration of the drawings and in particular to FIGURE 1, there is shown for illustrative purposes a free-standing electric range 10 having a top cooking surface or cooktop 11 with a plurality of surface heating elements 12, an oven cavity 13 formed by a box-like oven liner 14 and a front-opening drop door 15. The oven cavity 13 is supplied with the two standard oven heating elements; namely, a lower baking element 16 and an upper broiling element 17. A third heating element has been added adjacent the oven door 15 to replenish the heat lost in this area and thereby retain generally uniform oven wall temperatures. This third heater is identified as a mullion or perimeter heater 18 that is wrapped around the outside of the oven liner; for example, in a manner that is taught by the Newell Patent 3,017,488, which is assigned to the General Electric Company, the assignee of the present invention.

The control of the surface heating elements 12 is obtained by selector switches 20 which are illustrated as multiple pushbutton switches arranged in pairs along the opposite side arms of the cooktop 11 to be oriented with the particular heating element that is being controlled thereby. In addition, the range is provided with a backsplash 21 that is vertically disposed along the back edge of the cooktop 11 and provided with an instrument or control panel 22 as is best seen in FIGURE 1. This control panel contains most of the remaining controls for the surface heating elements 12 as well as for the oven compartment 13. Such a control panel would ordinarily include an oven selector switch, an oven thermostat or temperature responder, an automatic surface unit control, a sequence timer and suitable indicator lights to show when any one of the heating elements is energized.

Other structural features that might be mentioned by name would be the outer range body or cabinet 27 which has an appearance finish of porcelain enamel or the like on the outer surface, and which serves as the superstructure that supports and encloses the various components of the range. Sandwiched between the oven liner 14 and the range body or cabinet 27 is an extra thick blanket of thermal insulating material 28 such as fiber glass or the like. The amount of insulation being used has been increased over the amount of insulation for standard ovens because of the high operating temperatures encountered during the heat cleaning operation which will reach a maximum oven air temperature somewhere between 750° F. and 950° F.

During the heat cleaning operation water vapor, free carbon, soot, carbon monoxide gases and other products of combustion are formed and these are treated before they are returned to the kitchen atmosphere. A catalytic oxidation unit or smoke eliminator 30 is positioned in an oven vent opening 31. This catalytic smoke eliminator is of the type that is taught in the patent of Stanley B. Welch 2,900,483, which is assigned to the General Electric Company, the assignee of the present invention. Such a smoke, odor and vapor eliminating device includes a heating means in cooperation with a catalytic platinum surface such as a wire screen that is heated to a temperature of about 1300° F. and tends to consume smoke, odors and vapors emanating from the oven cavity, so that the oven exhaust air is treated in the manner that is best described in the aforesaid Hurko patent before being returned to the kitchen.

It has been found necessary to provide a door latching means for the oven door 15 to insure that the oven door is closed and cannot be opened while the oven is being operated during a high temperature heat cleaning cycle. A suitable door latching mechanism is identified as element 33 in FIGURES 1 and 2, although it is best taught and claimed in the recently issued patent of Clarence Getman 3,189,375 which is assigned to the General Electric Company, the assignee of the present invention. Accordingly, only brief mention will be made here of the door latching mechanism as it does not form part of the present invention. Other door latching mechanisms could be used without departing from the present invention.

Figure 2:
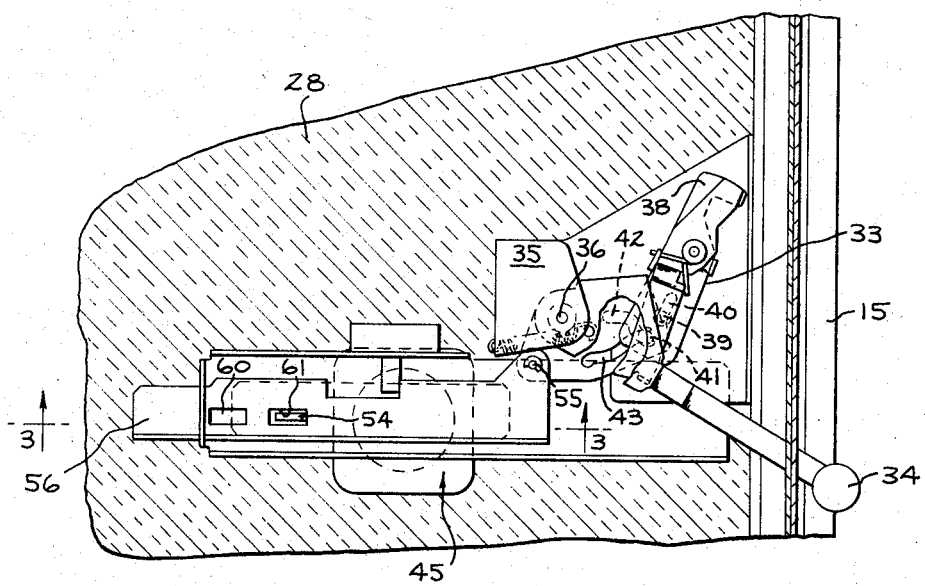
FIGURE 2 is a fragmentary plan view taken on the line 2—2 of FIGURE 1 to show the nature of the door latching mechanism and its relationship with the thermally responsive means for locking the door latching mechanism during the high temperature heat cleaning operation.
Figure 3:
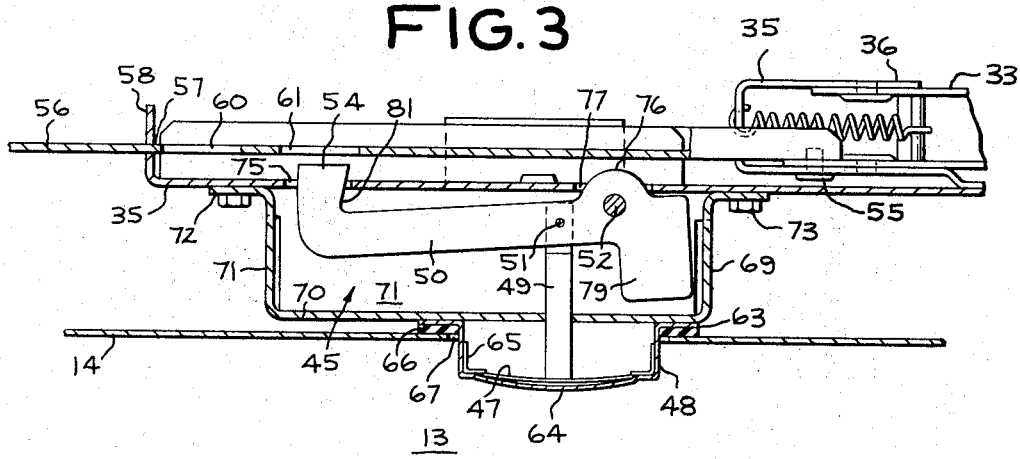
FIGURE 3 is a fragmentary elevational view on an enlarged scale of the thermally responsive locking means taken on the line 3—3 of FIGURE 2.

The illustrated mechanism includes a manually operable handle lever 34 which extends through an elongated slot 37 in the front edge of the cooktop 11 in a position just above and parallel to the top edge of the oven door 15 as is best seen in FIGURE 1. Referring to FIGURE 2, the handle lever 34 is pivotally supported from a fixed mounting bracket or base plate 35 to swing about the pivotal axis 36. The handle lever 34 is capable of movement within a horizontal plane through an angle of about 60°, starting from the open position of FIGURE 2 to a closed position. Next, there is a latching bolt 38 which is pivotally actuated by several pin and slot connections between a recessed or hidden position as shown in FIGURE 2 to a latching position where the bolt extends generally perpendicularly to the front wall of the oven and in mating engagement with a keeper (not shown) within the oven door 15. There is a fixed pin 39 that cooperates with a slot 40 in the latching bolt 38. The innermost end of the latching bolt 38 is provided with a follower pin 41 which operates within cam slots 42 and 43 respectively. Perhaps it will suffice to mention that the door latching mechanism 33 includes a pivoted handle lever 34, a fixed mounting bracket 35 and a pivoted latching bolt 38 for making engagement with the oven door 15. If more details of this mechanism are desired they can be obtained from the Getman patent, cited above.

The description given above has been for the purpose of setting the stage and explaining the environment and utility for the present invention that deals with a thermally responsive locking means 45 for the door latching mechanism 33. Broadly stated, the locking means 45 comprises the following elements: a snap-acting bimetallic temperature sensor or disc 47 supported in a cannister 48, a vertical link member 49 attached to the center portion of the bimetal, and a loosely pivoted bolt member 50 to which the link member 49 is loosely attached as at pivot 51, which is at a point closely adjacent the pivotal axis 52 of the bolt member. The bolt member has at its distal end a hook or finger portion 54 which extends upwardly and is adapted to engage a portion of the door latching mechanism 33.

For example, pivotally connected to the handle lever 34 about a vertical pivot pin 55 is a strut member 56 which is capable of reciprocating movement as the handle lever is moved between its two extreme positions. This strut member 56 is guided in its movement by having its distal end located within a slot 57 of a flange 58 that extends upwardly from the base plate 35. The strut member 56 includes a pair of slots 60 and 61 that are longitudinally spaced from each other adjacent the distal end of the strut. Each slot 60 and 61 is for receiving the finger portion 54 of the bolt member 50 in its raised position. Slot 60 receives the finger of the bolt 50 when the door latching mechanism is in its closed position which is the normal situation. However, the slot 61 has also been provided to take care of an unusual situation where there might be an excessive temperature within the oven cavity during normal cooking operations when the door latch mechanism 33 was in an open position. At such a time it would be undesirable to have the bolt member trying to engage the door latching mechanism and instead merely pressing against the underside of the strut member 56. This could cause a premature failure of the temperature sensing bimetal 47 and necessitate the replacement thereof, hence, this safety feature of a second slot 61 has been built into the structure.

It is also deemed important to locate the bimetal 47 within the oven cavity 13 as well as to mount the cannister 48 from the wall of the oven liner 14 so that the temperature sensing bimetal senses not only the oven air temperature but also the oven wall temperature so as to effect a compromise between these two temperature gradients and obtain better temperature control. The cannister 48 is a shallow cup-shaped member having an outwardly directed flange 63 around the top edge thereof. The bimetal 47 is a circular disc that is seated over a concave bottom wall 64 of the cannister 48 and held in place by several L-shaped metal tabs 65 which are fixed to the inner side of the cannister and bear upon the periphery of the bimetal at several radially spaced points. A high temperature gasket material 66 of annular shape is sandwiched between the flange 66 of the cannister 48 and the peripheral edge of an opening 67 in the oven liner wall through which the cannister 48 protrudes into the oven cavity 13 so as to seal the opening from the escape of smoke and heat energy.

The bolt member 50 is also encased in a hollow housing 69 of sheet metal construction having a bottom wall 70, four side walls 71 and a pair of outwardly directed attaching flanges 72 at the opposite sides thereof for receiving fastening screws 73. A pivot shaft 52 is supported from two of the side walls 71 to serve as the pivot means for the bolt member 50. This shaft 52 is smaller in diameter than the receiving opening in the bolt member so as to give a loose fit between these two members, since it is not practical to keep this joint lubricated because of the high temperatures encountered in the self-cleaning oven. The same situation prevails at the pivot point 51 between the link member 49 and the bolt member 50.

The lower end of the link 49 is integral with the center of the bimetal 47. Since the link has a loose fit at the pivot 51, the bolt member 50 is capable of swinging through a slight angle in a horizontal plane as well as in a vertical plane. Hence, it is well to provide an external guiding means for the bolt member 50. This is done by having the finger portion 54 of the bolt extend through a narrow slot 75 in the fixed mounting bracket 35. Moreover, in the vicinity of the pivoted portion of the bolt member 50 is provided an enlargement or extension 76 which is adapted to extend upwardly through a slot 77 in the mounting bracket 35. Thus, there is a two-point guiding action provided by slots 75 and 77 at opposite ends of the bolt member 50.

It is well to counter-balance the weight of the bolt member 50 because the snap-acting bimetal sensor 47 is not capable of exerting a force much over two grams, especially at a high temperature of around 1000° F. Accordingly, it is well to reduce the loading on the bimetal 47, and this is done by adding a mass 79 adjacent the pivoted end of the bolt member to oppose or balance the weight of the opposite end of the bolt. This permits the bimetal disc 47 to act against a lesser force thus insuring a long life for the system. Hence, the small force, small stroke of the snap-acting bimetal 47 is transformed by the link 49 and bolt 50 into a larger stroke of the finger portion 54 of the bolt member.

Notice that the working edge 81 of the finger portion 54 of the bolt is an inclined edge that leans slightly toward the direction of the pivotal axis 52 of the bolt member. Hence, when the door latching mechanism 33 is closed and the oven temperature is above about 560° F., the bimetal 47 will snap upwardly forcing the link member 49 to raise the bolt member 50 until the finger portion 54 extends through the slot 60 in the strut member 56 of the door latching mechanism thereby rendering the door latching mechanism inoperative until the oven temperature drops below this critical temperature of about 560° F. If the housewife were to forget this operational sequence and attempts to open the door latching mechanism 33 prematurely the strut member 56 would be moved slightly away from the front of the oven and the front edge of the slot 60 would engage the inclined working surface 81 of the finger portion 54 of the bolt. Because of this inclination and the relative position of this inclination to the pivot points 51 and 52 of the link member 49 and bolt member 50, the bolt member 50 will tend to increase its holding force as well as to reduce the resistance acting against the bimetal 47 so as to insure that no harm comes to the bimetal during such undesirable action.

It should be understood that while the critical temperature of the temperature sensor 47 is preferably above the normal maximum cooking temperature range of about 550° F. it would be permissible to have the thermally responsive locking means engage the door latching mechanism at about 475° F. and to disengage itself at a temperature as low as 350° F.

Modifications of this invention will occur to those skilled in this art, therefore, it is to be understood that this invention is not limited to the particular embodiments disclosed but that it is intended to cover all modifications which are within the true spirit and scope of this invention as claimed.

What I claim as new and desire to secure by Letters Patent of the United States is:

1. A high temperature oven for domestic use comprising a cabinet structure enclosing a box-like oven liner that has an open front that is adapted to be closed by an access door, the oven liner and door defining an oven cooking cavity, means for supplying heat energy into the oven cavity for normal cooking operations between about 150° F. and 550° F. as well as for a heat cleaning operation above about 750° F. for removing food soil lodged on the walls of the oven cavity, and door latching means movable between an open and closed position for holding the door closed during the heat cleaning operation, and a thermally responsive locking means engageable with the door latching means when the oven temperature is above about 500° F. so as to render the door latching means inoperative until the oven temperature returns to the normal cooking temperature range, the said locking means including a snap-acting bimetallic member positioned within a protective housing that is mounted in the cooking cavity through an opening in the top portion of the oven liner, a link member fixed to the bimetallic member and also connected to a pivoted bolt member at a point adjacent the pivotal axis thereof, said bolt member in its extended position being engageable with a portion of the door latching means when said latching means is in its closed position, the bolt member being incapable of transmitting forces initiated by the door latching means back to the bimetallic member but instead serving to increase its holding force while at the same time unloading the forces exerted on the bimetallic member.

2. A high temperature oven for domestic use comprising a cabinet structure enclosing a box-like oven liner that has an open front and an access door for closing the oven liner and defining an oven cooking cavity, means for supplying heat energy into the oven cavity for normal cooking operations between about 150° F. and 550° F. as well as for a heat cleaning operation above about 750° F. for removing food soil lodged on the walls of the oven cavity, and door latching means movable between an open and closed position for holding the door closed during the high temperature operation, and a thermally responsive locking means engageable with the door latching means in its closed position when the oven temperature is above about 560° F. to render the door latching means inoperative and prevent access to the oven cavity until the oven temperature returns below about 500° F., said thermally responsive locking means including a snap-acting bimetallic actuator supporting a link member that is connected to a pivoted bolt member, the bimetallic actuator being enclosed in a protective housing that extends through an opening in the oven liner and mounted thereto so as to be sensitive to both oven air and oven liner temperatures, the link member extending outwardly of the oven liner, the bolt member being pivoted about an intermediate point so as to be substantially counter-balanced, one end of the bolt member having a finger portion that is adapted to engage the door latching means when in an extended position, said finger portion having an inclined surface for engaging the door latching means so that an attempt to prematurely unlock the door latching means merely increases the holding force of the bolt member as well as relieves the forces resisting the action of the bimetallic member.

3. A high temperature oven for domestic use comprising a cabinet structure enclosing a box-like oven liner that has an open front, there being an access door for closing the front of the oven liner and forming an oven cooking cavity, means for supplying heat energy into the oven cavity for normal cooking operations between about 150° F. and 550° F. as well as for a high temperature operation above about 750° F. for removing food soil lodged on the walls of the oven cavity, and door latching means movable between open and closed positions for holding the door closed during the high temperature operation; the invention comprising a thermally responsive snap-acting locking means cooperating with the door latching means so at a critical temperature range of about 500° F. and above the locking means will render the door latching means inoperative and prevent the opening of the oven door, said locking means including a snap-acting bimetallic member located within the oven cavity, and a pivoted bolt member that carries a link member that is fixed at one end to the bimetallic member, the link member being loosely connected to the bolt member adjacent the pivotal axis thereof, the pivoted bolt member also being loosely mounted on its pivot means, one end of the bolt member having a finger portion for making engagement with the door latching means, the bolt member also being elongated so as to transform the small force, small stroke of the bimetallic member to a large stroke of the bolt member.

References Cited

UNITED STATES PATENTS 3,050,048   8/1962   Scott _____ 126—273

FREDERICK L. MATTESON, JR., *Primary Examiner.*

E. G. FAVORS, *Assistant Examiner.*